United States Patent [19]

Richards

[11] 4,453,763

[45] Jun. 12, 1984

[54] FRAME AND BODY CONSTRUCTION FOR AUTOMOTIVE PASSENGER VEHICLE

[75] Inventor: Louis R. Richards, Mokena, Ill.

[73] Assignee: Trihawk, Inc., Mokena, Ill.

[21] Appl. No.: 367,898

[22] Filed: Apr. 13, 1982

[51] Int. Cl.[3] ........................ B62D 27/04

[52] U.S. Cl. ........................ 296/185; 296/191; 296/205; 296/35.3; 296/31 P; 280/756; 180/215

[58] Field of Search ........................ 296/185–187, 296/196, 197, 203–206, 35.1, 35.3, 31 P, 37.12, 70, 73, 154, 190; 280/281 LP, 756, 5 A; 180/69.2, 210, 211, 212, 213, 215

[56] References Cited

U.S. PATENT DOCUMENTS

| | | | |
|---|---|---|---|
| 2,765,863 | 10/1956 | Barényi | 296/37.12 |
| 3,323,608 | 6/1967 | Eggert, Jr. | 296/187 |
| 3,409,323 | 11/1968 | Schweser | 296/185 |
| 3,550,948 | 12/1970 | Thompson, Jr. | 296/185 |
| 3,583,513 | 6/1971 | MacAdam | 180/69.2 |
| 4,079,986 | 1/1977 | Redford | 296/35.3 |
| 4,098,520 | 7/1978 | Ezaki et al. | 280/5 A |
| 4,171,141 | 10/1979 | Hobrecht | 280/756 |
| 4,382,626 | 5/1983 | Spooner | 296/31 P |

OTHER PUBLICATIONS

The "*Automobile Engineer*", Apr. 1954, pp. 147–149, Article entitled Minicars.

*Road and Track*, Sep. 1968, pp. 77–79, Article entitled "Meet the Toad.

*Hot Rod*, Mar. 1969, pp. 34–38, Article entitled "Light Weights".

The *Automobile Engineer*, Feb. 1934, pp. 63–66, Article entitled "Three Wheelers".

*Primary Examiner*—Robert B. Reeves

*Assistant Examiner*—Dennis Pedder

*Attorney, Agent, or Firm*—Kinzer, Plyer, Dorn & McEachran

[57] ABSTRACT

A small, lightweight, three-wheel two-passenger automotive vehicle has a rigid, open main box frame of tubular steel formed by two spaced side rails joined by front and rear rails, with a motor mount frame extending forwardly from the main frame; a unitary, one-piece tub of molded, glass fiber reinforced resin fills most of the main frame opening and peripheral flanges on the tub are resiliently mounted on the side rails of the main frame. The bottom of the tub extends below the side rails of the main frame, affording a support floor and side walls for a passenger compartment encompassed by the main frame and also providing a cover or support, or both, for such vehicle components as a hand brake lever, gear shift lever, fuel tank, transmission, etc. A unitary, one-piece body shell of molded, glass fiber reinforced resin is resiliently mounted on the tub and covers the exterior of the main frame; a unitary one-piece fiber glass hood is provided to complete the vehicle body. A sealing gasket seals substantially the entire periphery of the tub to the body shell.

7 Claims, 15 Drawing Figures

Fig. 10.
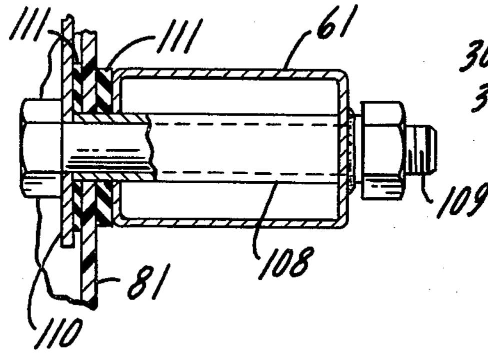
Fig. 11.
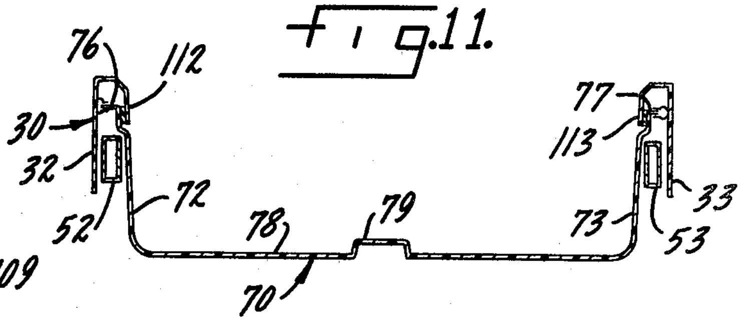
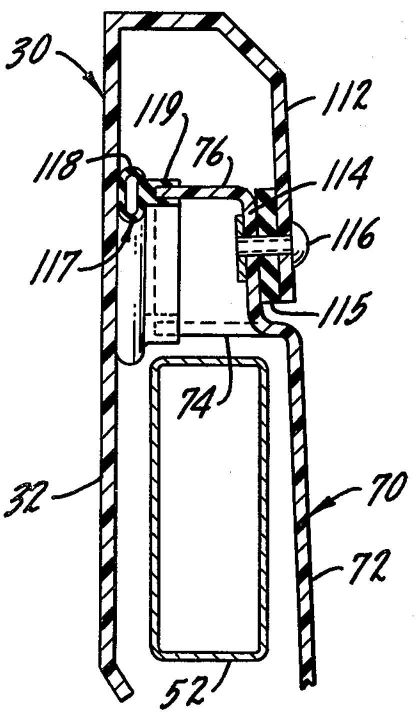
Fig. 12.
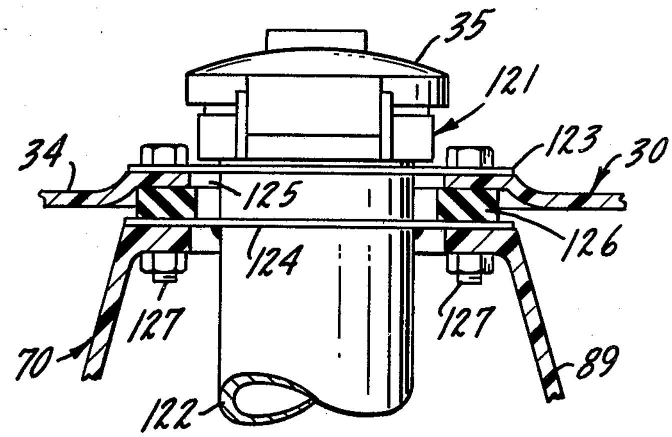
Fig. 13.
Fig. 14.
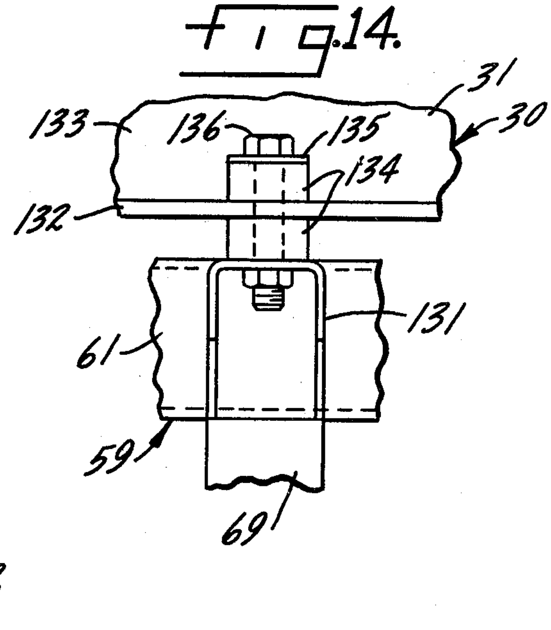
Fig. 15.
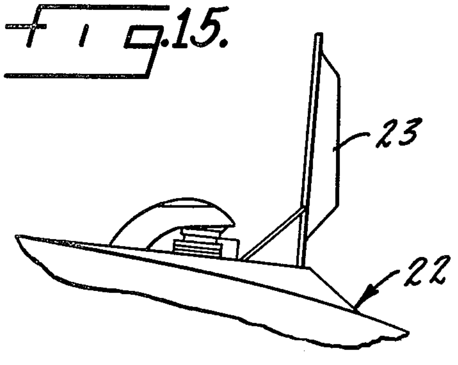

FRAME AND BODY CONSTRUCTION FOR AUTOMOTIVE PASSENGER VEHICLE

BACKGROUND OF THE INVENTION

Since the initial oil embargo of 1973, automotive vehicles, particularly passenger cars, have steadily decreased in size and weight, primarily to conserve fuel. At the same time, there has been increased interest in motorcycles, which are inherently much more fuel efficient than even the smallest of automobiles. On the other hand, motorcycles are inherently less safe than automobiles and are unacceptable to many potential motorist users. The present invention is concerned with a small automotive passenger vehicle that retains the light weight, inherent fuel economy, and performance characteristics of a motorcycle while at the same time providing many of the basic safety features of a conventional automobile.

Achievement of a combination of the desirable features of both types of vehicles presents a number of difficult technical problems, particularly in relation to the frame and the body of the vehicle. Thus, it is most difficult to provide a strong, durable, and safe frame and body construction, typical of an automobile, in a vehicle that is in the same general weight class as a motorcycle and that retains the performance characteristics of a motorcycle. The same situation applies to a construction that will afford the operational stability of an automobile in a construction having a weight not substantially greater than that of a large motorcycle.

Esthetic considerations are always of substantial interest in connection with automotive vehicles. If a manufacturer of automotive vehicles provides a substantial variety of different body colors, as often demanded by the purchasing public, a dealer must maintain a large stock of vehicles to satisfy immediate delivery demands. The stock requirements for such dealers can be greatly reduced if the entire external body of the vehicle is readily removable and replaceable. In these circumstances, the dealer need stock only a limited number of vehicles together with a substantially larger number of bodies of different colors and in different styles. A vehicle body and frame construction allowing for prompt substitution of one external body for another, by the dealer, can thus effectively increase the overall stock of the dealer though only the number of different bodies not complete vehicles, is increased. At the same time, a removably mounted body shell on an automotive vehicle affords the dealer the option, in the event of an accident, of lending a temporary body to the vehicle owner during a period when body repairs are being effected, so that the vehicle continues in use even during major body repairs.

SUMMARY OF THE INVENTION

It is an object of the invention, therefore, to provide a new and improved frame and body construction for a small, lightweight automotive passenger vehicle that enables construction of a vehicle combining the performance and fuel economy characteristics of a motorcycle with the safety and stability characteristics of an automobile.

Another object of the invention is to provide a new and improved frame and body construction for a small, lightweight automotive passenger vehicle that allows for substitution of a complete body shell, determinative of the appearance of the vehicle, by a dealer or other mechanic, in a limited time (e.g., an hour or less).

A specific object of the invention is to provide a new and improved tub-type body mounted in an encompassing protective tubular metal frame, for a small, lightweight automotive passgenger vehicle, that effectively isolates the tub body from engine vibration and minor road vibration, yet affords effective support and protection for the users of the vehicle at minimal cost and with minimum weight.

A further specific object of the invention is to provide a new and improved frame and body construction for a small, lightweight automotive passenger vehicle in which the entire external body consists of only two members, an engine hood and a body shell, each comprising a single, unitary, molded glass fiber reinforced resin member.

Another object of the invention is to provide a new and improved peripheral seal between a molded fiber glass tub constituting the internal body of a small, lightweight automotive passenger vehicle and an external body shell for that vehicle, sealing the entire periphery of the vehicle against entry of water or dirt from the road.

An additional object of the invention is to provide a new and improved frame and body construction for a small, lightweight automotive passenger vehicle that is simple and economical and that is easy to service and maintain.

Accordingly, the invention relates to a frame and body construction for a small, lightweight automotive passenger vehicle, comprising a rigid, open main box frame of tubular metal comprising two side rails spaced from each other and joined at their opposite ends by a front rail and a rear rail; a unitary, one-piece tub of molded, fiber reinforced resin is mounted in and fills at least a major part of the open portion of the main frame, the tub having peripheral side flanges that extend over the side rails of the main frame. The tub includes depending walls extending below the main frame, and affords a continuous support floor for a passenger compartment encompassed by the tub walls and the main frame; the tub further comprises a support for one or more vehicle components such as a battery, a hand brake lever, and a gear shift lever, and also comprises a rear extension panel covering the rear portion of the frame. A plurality of resilient mounting means are provided for mounting the tub flanges on the main frame at a plurality of spaced locations, each mounting means including a resilient rubber spacer interposed between the tub and the frame.

In a preferred construction, the invention further comprises a unitary, one-piece external body shell of molded, fiber reinforced resin mounted on the tub and extending outwardly and downwardly therefrom around the sides and across the front and rear of the main frame, covering the main frame, the body shell including internal mounting flanges aligned in overlapping relation to portions of the side flanges of the tub; resilient mounting means are provided for mounting the body shell on the tub.

BRIEF DESCRIPTION OF THE DRAWINGS

FIG. 10 is an enlarged detail sectional view taken approximately as indicated by the line 10—10 in FIG. 3;

FIG. 11 is a detail sectional view taken approximately as indicated by line 11—11 in FIG. 1;

FIG. 12 is a further detail sectional view, on a enlarged scale, of one side of FIG. 11;

FIG. 13 is a detail sectional view, on an enlarged scale taken approximately as indicated by line 13—13 in FIG. 1;

FIG. 14 is a detail sectional view on an enlarged scale, taken approximately as indicated by line 14—14 in FIG. 1; and FIG. 15 is a detail view illustrating the operation of an auxiliary cover incorporated in the hood of the vehicle.

DESCRIPTION OF THE PREFERRED EMBODIMENT

Figure 1:
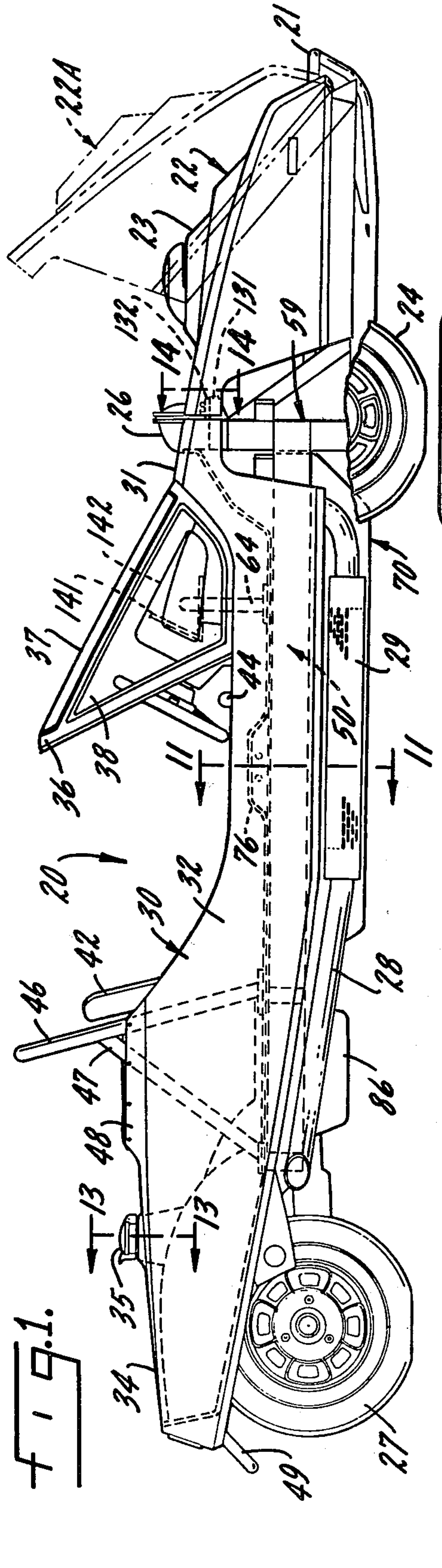
FIG. 1 is a side elevation view of a small, light-weight three wheel automotive passenger vehicle incorporating a frame and body construction according to one embodiment of the present invention, with a portion of the vehicle cut away to reveal body and frame members.
Figure 2:
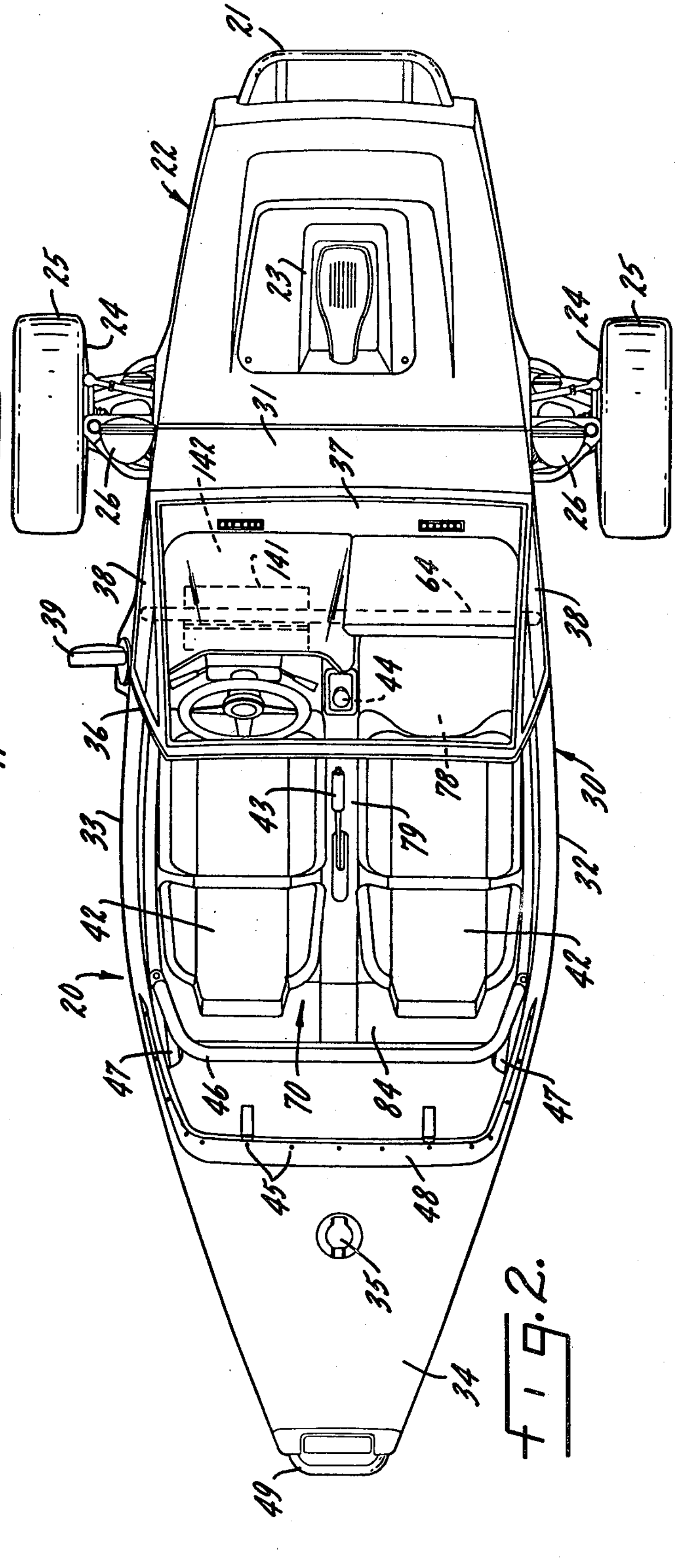
FIG. 2 is a plan view of the vehicle of FIG. 1.

FIGS. 1 and 2 illustrate a small, light-weight three wheel automotive passenger vehicle 20 which incorporates a frame and body construction according to the present invention. Vehicle 20 accommodates just two people, a driver and one passenger. Overall vehicle weight is typically less than 1500 pounds. The vehicle engine is preferably air cooled to keep the weight down, but a water cooled engine could be used. An engine in the range of fifty to eighty horsepower is preferred.

Starting at the front of vehicle 20, the right-hand end as seen in FIGS. 1 and 2, the vehicle includes a tubular metal front bumper 21 which extends back under a pivotally mounted engine hood 22. Hood 22 is of unitary, one-piece construction, molded of glass fiber reinforced resin (fiber glass). A small central auxiliary cover or hatch 23 is mounted on hood 22 and is employed for checking of the oil level and addition of oil without the necessity of raising hood 22.

As shown in FIGS. 1 and 2, vehicle 20 has two front wheels 24; the front wheels 24 serve for both driving and steering of the vehicle. Two headlamps 26 are mounted immediately inboard of wheels 24, and the wheels are provided with separate fenders 25. Fenders 25 are not joined to the body of the vehicle. Rather, they are mounted on the wheel suspensions to move conjointly with the wheels as in a motorcycle.

Vehicle 20 has a single rear wheel 27 located at the rear of the vehicle (FIG. 1) in a centered position. Wheel 27 is utilized only to support the vehicle; it is not employed for either a steering function or a driving function. Also as shown in FIG. 1, vehicle 20 includes an exhaust pipe 28 extending along the outside of the vehicle from front to rear, with a muffler 29 interposed in the exhaust pipe. A second similar exhaust pipe (not shown) may be provided on the opposite side of the vehicle.

Vehicle 20, FIGS. 1 and 2, further comprises a body shell 30 covering the top front, the sides, and the deck of the vehicle. Body shell 30 is a unitary, one-piece shell molded from a glass fiber reinforced resin of the type commonly referred to as fiber glass. Shell 30 includes a transverse front panel 31 that extends across the top front of the vehicle adjacent to and in alignment with the engine hood 22. Two side panels 32 and 33 that are a part of body shell 30 extend back along the opposite sides of the vehicle from front panel 31 to a transverse rear deck panel 34 at the rear of vehicle 20. A fuel filler cap 35 projects above the top of rear deck panel 34.

At the front of the vehicle, a windshield frame 36 is mounted upon the body shell 30 and provides a mount and support for a center windshield panel 37 and two side panels 38. Windshield frame 36 is preferably a unitary fiber glass molding but is separate from body shell 30, being secured to the body shell by any suitable fastening means (not shown). The fasteners for windshield frame 36 are preferably of a type permitting ready removal of the windshield structures 36–38 for reasons discussed below. A rear view mirror 39 is mounted on body shell 30 at the driver's side of vehicle 20, as best shown in FIG. 2.

A roll bar 46 extends across the intermediate rear portion of vehicle 20. A pair of roll bar braces or struts 47 are welded to roll bar 46 and project downwardly and rearwardly through body shell 30; struts 47 add stability and strength to the roll bar. An upwardly projecting ledge 48 formed as an integral part of the body shell 30 provides a means for anchoring a cloth top (not shown) to the rear deck of the vehicle; a series of snap fasteners 45 are provided for this purpose. A small tubular steel "touch" bumper 49 projects downwardly and outwardly from the rear of vehicle 20.

Figure 3:
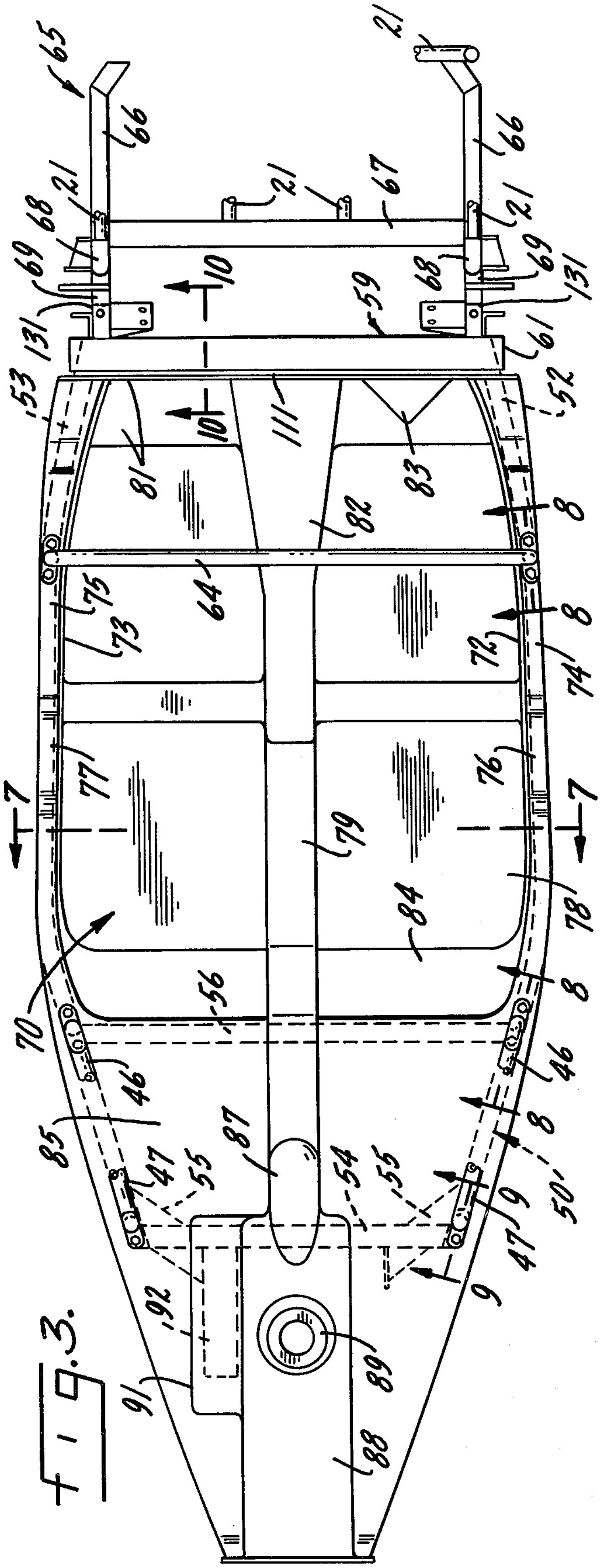
FIG. 3 is a plan view of the frame and a portion of the body of the vehicle of FIGS. 1 and 2.
Figure 4:
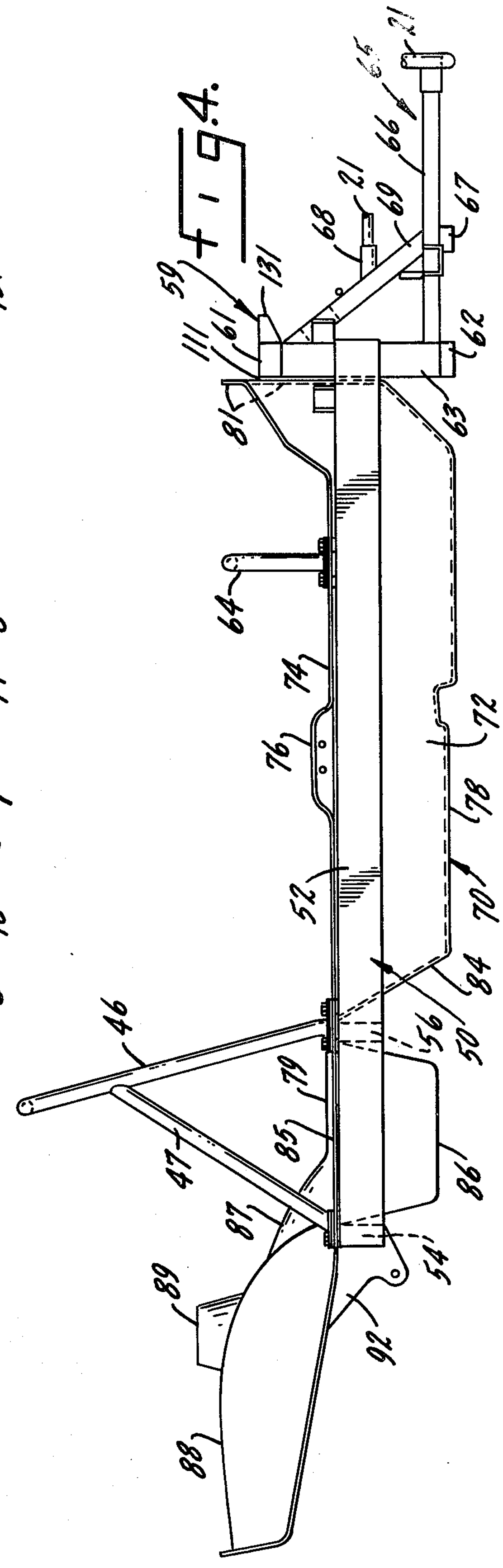
FIG. 4 is a side elevation view of the frame and body members illustrated in FIG. 3.

A major portion of the body and frame construction of the present invention, as incorporated in vehicle 20, is illustrated in FIGS. 3 and 4. As shown therein, the vehicle includes an open main box frame 50 formed throughout of tubular steel members. The tubular steel frame members are preferably of rectangular cross sectional configuration, as shown in the various drawings. The main frame 50 includes two elongated side rails 52 and 53 which are interconnected, near the rear of the vehicle, by a rear end rail 54 with corner braces 55. A short distance forwardly from the rear end rail 54 is a transverse frame member 56, extending between the two side rails 52 and 53. Frame member 56 defines the front of a fuel tank enclosure (the rear end is rail 54) and also defines the rear limits of a passenger compartment. At the front end of the vehicle, the two side rails 52 and 53 are interconnected by a front end rail structure 59. The front end rail 59 is of box configuration, including top and bottom transverse rail members 61 and 62 and two vertical members 63. The overall configuration of the front end rail structure 59 construction is further illustrated in FIG. 5.

A cowl bar 64 extends across the main frame 50, relatively close to but spaced from the front end rail 59.

An engine mount frame 65 is affixed to and extends forwardly from the front end of the main frame 50. Engine frame 65 comprises two longitudinally projecting frame members 66, a transverse frame member 67, and two angle braces 69. The engine mount frame 65 also includes the front end rail structure 59 of the main frame. The engine mount frame includes suitable sockets 68 for mounting the front bumper 21.

A major component of the body of vehicle 20 is a tub 70 (FIGS. 3, 4 and 7) which is mounted in and fills the open portion of main frame 50. Tub 70 is a unitary, one-piece member formed of molded, glass fiber reinforced resin. Tub 70 has two side walls 72 and 73 extending inwardly and downwardly from frame members 52 and 53 respectively. The tub side wall 72 has an integral flange 74 that extends over the main frame side rail 52; similarly, side wall 73 of tub 70 is formed with a integral flange 75 that projects out over the top of the frame side rail 53. As shown in FIG. 4, tub flange 74 has a central elevated portion 76 and, as indicated in FIG. 3, there is a similar elevated segment 77 in the tub flange 75 at the opposite side of the vehicle.

Figure 7:
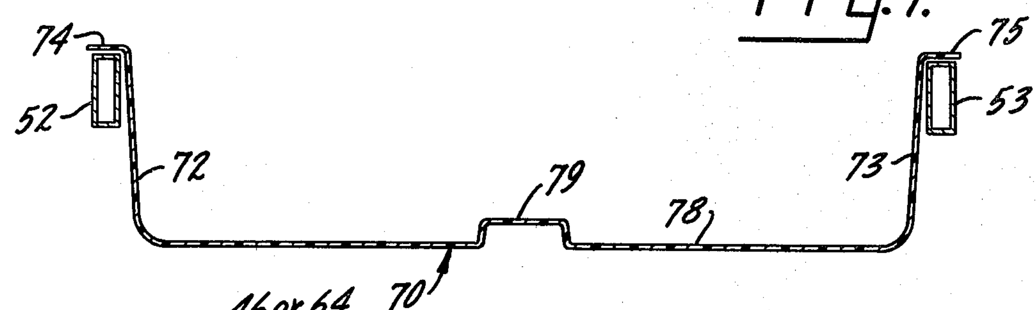
FIG. 7 is a simplified detail sectional view taken approximately as indicated by line 7—7 in FIG. 3.

A passenger compartment floor 78 constituting an integral part of tub 70 extends across the bottom of the vehicle between the tub side walls 72 and 73 as shown in FIGS. 3, 4, and 7. A central longitudinal hump 79 of varying height is formed in floor 78. Hump 79 is not a drive shaft cover (vehicle 20 uses front wheel drive); rather, it constitutes a support for the hand brake lever mechanism 43 and the gear shift lever 44 (FIG. 2) and a passage for brake fluid, fuel, and electrical lines. The tub floor 78 itself constitutes the support for two seats 42 (FIG. 2).

The front wall 81 of tub 70 is of varying contour but extends well above the top transverse rail 61 of the main frame front end rail structure 59; see FIGS. 3 and 4. This front wall 81 of tub 70 provides a fire wall separating the vehicle engine from the passenger compartment of the vehicle. The central portion of wall 81, a continuation of hump 79, affords a cover 82 for the transmission of the vehicle. On the right-hand side of the vehicle, looking forwardly, the configuration of the bottom of tub 70 is such as to provide an accessible housing 83 for a battery.

Figure 6:
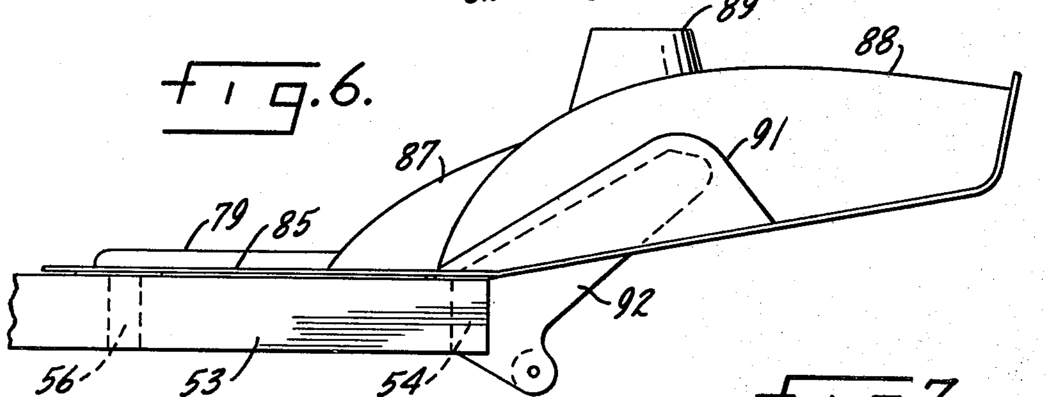
FIG. 6 is a detail side elevation view of the rear portion of the frame and body construction as illustrated in FIG. 4 but taken from the opposite side of the vehicle.

Tub 70 further comprises a wall 84, at the rear of the passenger compartment, that extends upwardly from floor 78 adjacent the intermediate transverse frame member 56. From wall 84, tub 70 extends further to the rear of the vehicle, affording a deck floor 85 that also constitutes a cover and support for a vehicle fuel tank 86. Fuel tank 86 is preferably of the fuel cell type, comprising a rigid outer shell enclosing a foam-filled resilient, flexible bladder. A central elevated portion 87 of the fuel tank cover and deck floor 85 provides a cover for a fuel filler tube (not shown) connecting the fuel filler cap 35 (see FIGS. 1 and 2) to fuel tank 86 (FIG. 4). This elevated portion 87 of deck 85 merges into a fender 88 for the rear wheel of the vehicle. A cylindrical support 89 for the fuel filler cap 35 is formed integrally with fender 88. As shown in FIG. 6, the rear fender segment 88 of tub 70 includes a lateral extension 91 covering the upper portion of a mounting member 92 utilized for mounting the rear wheel on the vehicle.

Figure 8:
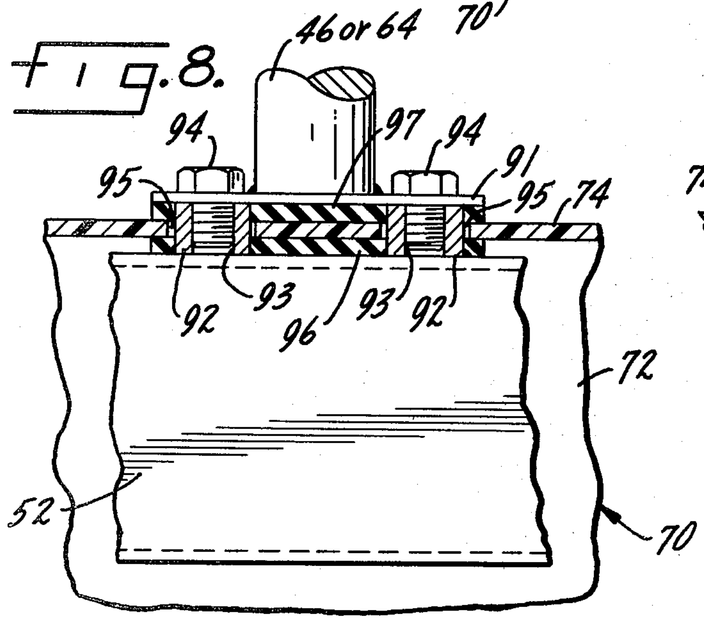
FIG. 8 is a detail sectional view, on an enlarged scale, taken at either of the locations generally indicated by lines 8—8 in FIG. 3.
Figure 9:
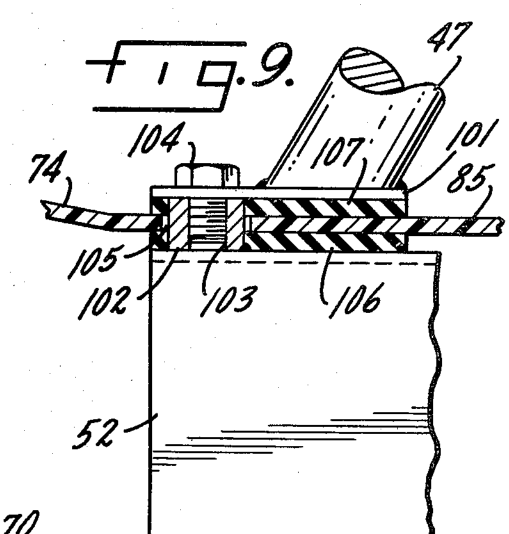
FIG. 9 is a detail sectional view, on an enlarged scale, taken approximately as indicated by line 9—9 in FIG. 3.

Resilient mounting means are provided for mounting the two tub flanges 74 and 75 on the main frame side rails 52 and 53, respectively. These resilient mounting means are illustrated in FIGS. 8 and 9. Referring to FIG. 8, it is seen that one of the lower ends of roll bar 46 (or cowl bar 64, as the case may be) is welded to a metal mounting plate 91. Mounting plate 91 is supported upon two cylindrical steel spacers 92 that are welded to the top surface of one of the side rails 52,53 of frame 50, in this instance the side rail 52. Each of the spacers 92 has a central threaded aperture 93 aligned with an aperture in mounting plate 91. Two machine screws 94 extend through the apertures in mounting plate 91 and are threaded into the central apertures 93 in spacers 92 to afford a firm mounting of the roll bar or the cowl bar on the side rail of the frame.

The side flange 74 of tub 70 is provided with two openings 95 that permit the tub flange to fit down over spacers 92. Preferably, openings 95 are made large enough so that the tub flange fits easily over the spacers. Two rubber pads 96 and 97 are incorporated in the resilient mount illustrated in FIG. 8. Pad 96 fits between tub flange 74 and the top surface of the frame side rail 52, whereas pad 97 is interposed between mounting plate 91 and the top surface of the tub flange. It is thus seen that the flange mount illustrated in FIG. 8 provides a resilient, floating mount for tub 70. This particular mounting is utilized at the four points at which the roll bar 46 and the cowl bar 64 are joined to frame 50 and to tub 70.

A similar resilient mounting arrangement is utilized at the bottom end of each of the roll bar braces or struts 47. Thus, as shown in FIG. 9, the bottom end of each strut 47 is welded to a mounting plate 101 which is supported upon a cylindrical metal spacer 102 that is welded to the top surface of the end of a frame side rail, in this instance rail 52. Spacer 102 has an internal threaded aperture 103 for receiving a machine screw 104 that securely anchors mounting plate 101 on top of spacer 102.

The side flange 74 of tub 70 is provided with an opening 105 that permits the tub flange to fit down over spacer 102. Preferably, opening 105 is made large enough so that the tub flange fits easily over the spacer.

As in the construction shown in FIG. 8, the resilient mount of FIG. 9 includes two rubber spacer pads 106 and 107. Pad 106 is interposed between the bottom surface of tub flange 74 and the top surface of frame side rail 52. Rubber pad 107 is positioned between mounting plate 101 and tub flange 74.

It is also desirable to provide a resilient mount for the front wall 81 of tub 70, connecting wall 81 to the transverse frame member 61 that is a part of the front end rail structure 59 of main frame 50 adjacent the master cylinder (not shown) for the vehicle brakes. This construction is shown in FIG. 10. As shown therein, a tube 108 is welded in place in frame member 61, extending outwardly of the frame member through an aperture in tub wall 81. A bolt 109 extends through tube 108, clamping tub wall 81 and a brake pedal assembly mounting bracket 110 to the frame member. Two resilient rubber pads 111 cushion the opposite surfaces of tub wall 81 at this location.

In all of the resilient mounts incorporated in the frame and body construction of the present invention, including pads 96, 97, 106, 107, and 111, and also those described hereinafter in connection with FIGS. 12–14, the designation of "rubber" is intended to include both natural rubber and synthetic rubbers. In most instances, synthetic rubbers are preferable.

FIG. 11 illustrates the general relationship between the side panels 32 and 33 of body shell 30 and the side walls 72 and 73 of tub 70 at the middle of vehicle 20, FIG. 11 constituting a simplified sectional view taken approximately along line 11—11 in FIG. 1. As shown in FIG. 11, the side panels 32 and 33 of the body shell are of inverted J-shaped configuration, including flanges 112 and 113 that extend inwardly and downwardly adjacent the central elevated flange portions 76 and 77 of the tub side walls and in approximately coplanar relation to tub side walls 72,73. These elevated portions 76 and 77 of the peripheral tub flange provide two main mounting points for mounting the body shell 30 on tub 70.

The side mounting arrangement for body shell 30 is shown in more detail in FIG. 12. The internal flange 112 of body shell side wall 32 extends downwardly into spaced parallel relation with the vertical portion 114 of the flange elevation 76 of tub wall 72. A rubber pad or spacer 115 is interposed between the body shell flange 112 and the tub wall element 114. Two bolts or like fasteners 116 (only one shown) extend through the resulting three-element assembly to afford a firm but resilient mounting arrangement for body shell 30 at this point. A similar resilient mount secures the other body shell side wall 33 to tub flange elevation 77 at the opposite side of the vehicle (see FIG. 11).

FIG. 12 also shows a gasket or seal member 117 utilized to provide a seal between body shell 30 and the edges of tub 70. Seal 117 is formed of rubber and includes an outer cylindrical portion 118 and an inner longitudinally slotted portion 119. The inner bifurcated portion 119 fits tightly onto the edge of tub 70, in this instance the edge of flange 74 and the edge of flange elevation 76. The outer bulb or cylinder portion 118 of seal member 117 engages and is partially flattened by the adjacent portion of body shell 30, in this instance the side panel 32 of the body shell. Seal member 117 extends completely around the periphery of tub 70 and affords an effective seal between the body shell and the tub throughout the periphery of the vehicle. In this manner, moisture and other debris from the road is precluded from entry into the interior of the vehicle or into any part of the space between tub 70 and body shell 30.

Another resilient mount for body shell 30 is provided at the rear of the vehicle, adjacent gas cap 35, and is shown in the detail view of FIG. 13. As shown therein, gas cap 35 is a part of a fitting 121 on the outer end of a fuel fill tube 122. The mounting arrangement for the rear deck panel 34 of body shell 30 includes a large metal washer 123 fitting over the opening 125 in body shell deck panel 34 through which fill pipe 122 extends. Another large metal washer 124, affixed to fill tube 122, engages the top surface of the support 89 for fitting 121 and fill cap 35 that is a part of the body tub 70. A resilient rubber pad or spacer 126 is interposed between support 89 and body shell deck panel 34. Two or more bolts or other suitable fasteners 127 extend through this assembly of mounting elements to afford a firm but resilient mount for deck panel 34 of body shell 30 at a centralized location in the rear of the vehicle (see FIG. 2).

Figure 5:
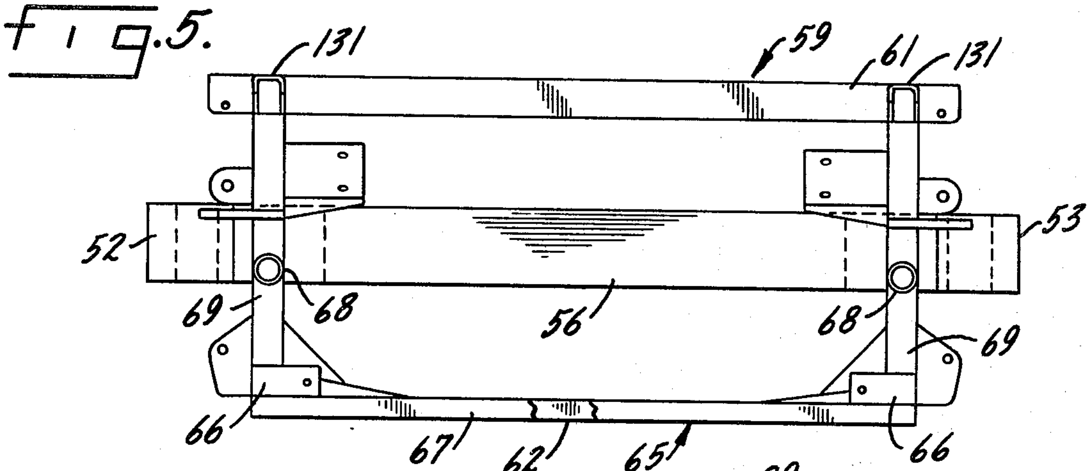
FIG. 5 is a detail front elevation view of the frame shown in FIG. 4.

Body shell 30 is also provided with a resilient mount at the front of the vehicle. As indicated in FIG. 5, there are two short mounting brackets 131 projecting forwardly from the transverse rail member 61 that constitutes the top member of the front rail structure 59 of frame 50. As shown in FIG. 14, each of the brackets 131 is aligned with a flange 132 on a depending portion 133 of the transverse front panel 31 of body shell 30; see also FIG. 1. Flange 132 (FIG. 14) is secured to each bracket 131 by a resilient mount comprising two cylindrical rubber spacers 134, a washer 135, and a bolt 136. It is thus seen that body shell 30 can be mounted on vehicle 20 by just eight or nine bolts or like fasteners, two bolts 136 at the front of the vehicle, two or three bolts 127 at the rear, and two bolts 116 at each side.

The molded fiber glass hood 22 is pivotally mounted on the engine mount frame of vehicle 20 and can be opened to the position 22A, FIG. 1, for general motor service. However, such service is required only at rare intervals except for checking the engine oil and adding oil when required. This is the purpose of the auxiliary cover or engine hatch 23. Hatch 23 can be pivoted to an open position as shown in FIG. 15 without raising hood 22. With hatch 23 in the open position, access is afforded to the dip stick and the oil filler cap of the vehicle engine. This permits checking and service with respect to the engine oil supply without the necessity of opening engine hood 22.

Cowl bar 64, in addition to strengthening the forward part of frame 50 and providing protection for the legs of the passengers in vehicle 20 (see FIG. 1) also constitutes the support for an instrument dashboard 141. Dashboard 141 is preferably formed of sheet aluminum and is mounted on the left central portion of cowl bar 64. The usual instruments for vehicle 20 (not shown) are mounted on dashboard 141; they may include a combined speedometer and odometer, a fuel gauge, an oil gauge, a temperature gauge, light switches, and such other instrumentation as may be desired. Dashboard 141 and the instruments that it supports are covered by a dashboard hood 142 that is readily removable to permit effective access to the dashboard instruments and their operating connections when required. As will be apparent from FIGS. 1 and 2, removal of windshield 36–38 and dashboard cover 142 exposes all wiring and other operational connection to the instruments on dashboard 141 for servicing from above, a material improvement as compared with the dashboard constructions used in most vehicles.

Vehicle 20, in a commercial embodiment, has a total weight of less than 1400 pounds when equipped with a sixty horsepower engine. The vehicle is subject to license, in most states, as a motorcycle. Indeed, vehicle 20 retains the fine acceleration and other performance characteristics normally attributed to a motorcycle. Nevertheless, the driver and other passenger in vehicle 20 are effectively protected on all sides by a strong encompassing steel frame; vehicle 20 is comparable in safety, in this regard, to many subcompact automobiles. On the road, vehicle 20 is quite stable; indeed, it is superior to most automobiles and virtually any motorcycle.

The consistent use of resilient mounting for body tub 70 within frame 50, particularly as exemplified by the resilient mounts illustrated in FIGS. 8 and 9, provides for improved operating characteristics as regards the comfort of the driver and other passenger. Thus, the resilient mounts for tub 70, in which the driver and other passenger are both supported, greatly minimize the transmission of engine vibration to the passengers. This also applies to minor road vibration, though of course any major jarring action will be transmitted to the passengers just as in any automotive vehicle. By the same token, the resilient mounting provided for body shell 30 allows enough "give" to minimize damage to the body shell in the event of a light, brushing contact with some external object.

As previously noted, there are just eight bolts or similar fasteners that hold body shell 30 on tub 70 and frame 50. To change the complete external appearance of vehicle 20, as regards color and, to a limited extent, even the configuration, it is only necessary to remove these eight bolts, lift off the body shell, and put a new body shell on the vehicle. This complete change of the body shell can usually be effected in a very short time interval, about half an hour. The light weight of the body shell makes this changeover operation possible by a single mechanic. Of course, if it is also desired to change the hood 22, a bit longer time period may be required, but this can be accomplished in only a minute or two.

It is readily possible for a vehicle dealer to stock a wide variety of body shells 30 and matching hoods 22 with only a limited number of vehicle chassis; with this arrangement, the dealer can meet any color combination and style combination desired by a purchaser without having to maintain a large stock of vehicles. At the same time, if a vehicle owner has an accident and comes to the dealer for repairs to the body shell or the hood, it is readily possible for the dealer to remove the damaged external body shell or hood, promptly replace it with another body member on a loan basis, and allow the motorist to use the vehicle while repairs are being completed.

The readily replaceable body shell 30 and hood 22 also simplify dealer stock problems. If a customer wants a red body, and none is assembled, it is easily possible to replace a different color body with a red one while the purchase documentation is being completed. The same situation applies to varying body styles; a roadster has been shown in FIGS. 1 and 2, but body shell 30 can be modified to include a complete top, affording a coupe construction for an otherwise unchanged vehicle 20.

I claim:

1. A frame and body construction for a small, lightweight automotive passenger vehicle comprising:

a rigid, open main box frame of tubular metal comprising two side rails spaced from each other and joined at their opposite ends by a front rail and a rear rail;

a unitary, molded one-piece tub of reinforced resin mounted in and filling at least a major part of the open portion of the main frame, the tub having peripheral side flanges that extend over the side rails of the main frame, and tub including depending walls extending below the main frame and affording a continuous support floor for a passenger compartment encompassed by the tub walls and the main frame;

first and second protection bars of tubular metal mounted on and extending over the main frame from one side rail to the other;

and a plurality of resilient mounting means for mounting the tub flanges on the main frame at a plurality of spaced locations, comprising resilient mounts located at each point of attachment between the frame and the protective bars, each resilient mount comprising:

at least one metal spacer affixed to a frame rail and projecting upwardly therefrom through an aperture in the tub flange, the spacer having an internally threaded aperture therein;

a metal mounting plate affixed to the end of the protective bar and having an aperture aligned with the spacer aperture;

a first resilient pad interposed between the frame rail top surface and the bottom surface of the tub flange;

a second resilient pad interposed between the top surface of the tub flange and the bottom surface of the mounting plate;

and a fastener extending through the aperture in the mounting plate and threaded into the spacer aperture to form a rigid connection between the bar and the frame rail and a resilient mounting connection between the frame and the tub flange.

2. A frame and body constrution for a small, lightweight automotive passenger vehicle, according to claim 1, and further comprising:

a unitary, one-piece molded external body shell of reinforced resin mounted on the tub and extending outwardly and downwardly therefrom around the sides and across the front and rear of the main frame, covering the main frame, the body shell including internal mounting flanges aligned in overlapping relation to portions of the side flanges of the tub;

and a plurality of resilient body shell mounting means for mounting the body shell on the tub.

3. A frame and body construction for a small, lightweight automotive passenger vehicle, according to claim 1, or claim 2, in which the vehicle is a three-wheel vehicle, having two driven wheels in front and one non-driven wheel in the rear, and in which the tub extends beyond the rear rail of the main frame to form a fender for the rear wheel.

4. A frame and body construction for a small, lightweight automotive passenger vehicle, according to claim 3, and further comprising:

an engine mount frame affixed to and extending forwardly from the front end of the main frame;

the tub including a front wall extending upwardly adjacent the front rail of the main frame to form an integral fire wall between the passenger compartment and the engine mount frame.

5. A frame and body construction for a small, lightweight automotive passenger vehicle comprising:

a rigid, open main box frame of tubular metal comprising two side rails spaced from each other and joined at their opposite ends by a front rail and a rear rail;

a unitary, molded one-piece tub of reinforced resin filling at least a major part of the open portion of the main frame and covering the rear portion of the main frame, the tub having peripheral side flanges that extend over the side rails of the main frame, the tub including depending walls extending below the main frame and affording a continuous support floor for a passenger compartment encompassed by the tub walls and the main frame;

a plurality of individual tub mounting means for mounting the tub on the frame, each mounting means having a resilient spacer between the tub and the frame;

a unitary, molded one-piece external body shell of reinforced resin mounted on the tub and extending outwardly and downwardly therefrom around the sides and across the front and rear of the main frame, covering the main frame and the sides and rear portion of the tub, the body shell including internal mounting flanges aligned in overlapping relation to portions of the side flanges of the tub;

and a limited plurality of individual releasable body shell mounting means resiliently removably mounting the body shell on the sides and rear of the tub, independently of any of the tub mounting means, with the body shell spaced from the frame and the tub, each body shell mounting means comprising a resilient spacer interposed between the tub and the body shell.

6. A frame and body construction for a small, lightweight automotive passenger vehicle, according to claim 5 and further comprising:

an elongated resilient rubber seal member mounted on and extending around substantially the entire periphery of the sides and rear of the tub, the seal member engaging the body shell throughout the length of the seal member, the seal member comprising a cylindrical seal portion formed integrally with and projecting from a slotted mounting portion, the slot of the mounting portion fitting tightly onto the edge of the tub and the seal portion engaging the body shell.

7. A frame and body construction for a small, lightweight automotive passenger vehicle, according to claim 5 or claim 6, in which the vehicle is a three-wheel vehicle, two driven wheels in front and one wheel in the rear, and in which the rear portion of the tub, extending beyond the rear rail of the main frame, forms a fender for the rear wheel.

* * * * *